(12) United States Patent
Fu et al.

(10) Patent No.: US 9,991,954 B2
(45) Date of Patent: Jun. 5, 2018

(54) METHOD FOR MONITORING WAVELENGTH OF TUNABLE LASER ON USER END BY OPTICAL LINE TERMINAL ON LOCAL END

(71) Applicant: Accelink Technologies Co., Ltd., Wuhan (CN)

(72) Inventors: Yanfeng Fu, Wuhan (CN); Qianggao Hu, Wuhan (CN); Di Zhang, Wuhan (CN); Shenglei Hu, Wuhan (CN); Yong Luo, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 0 days. days.

(21) Appl. No.: 15/300,097

(22) PCT Filed: Mar. 31, 2014

(86) PCT No.: PCT/CN2014/074453
§ 371 (c)(1),
(2) Date: Sep. 28, 2016

(87) PCT Pub. No.: WO2015/143730
PCT Pub. Date: Oct. 1, 2015

(65) Prior Publication Data
US 2017/0170898 A1    Jun. 15, 2017

(30) Foreign Application Priority Data
Mar. 28, 2014  (CN) .......................... 2014 1 0123387

(51) Int. Cl.
*H04B 10/08* (2006.01)
*H04J 4/00* (2006.01)
(Continued)

(52) U.S. Cl.
CPC ... *H04B 10/07957* (2013.01); *H04B 10/0799* (2013.01); *H04J 14/00* (2013.01);
(Continued)

(58) Field of Classification Search
CPC .......... H04B 10/07957; H04B 10/0799; H04B 10/0731; H04B 10/272; H04B 10/25754;
(Continued)

(56) References Cited

U.S. PATENT DOCUMENTS

| | | | |
|---|---|---|---|
| 7,317,874 B2* | 1/2008 | Li | H04B 10/506 |
| | | | 398/67 |
| 8,649,681 B2* | 2/2014 | Ohlen | H04J 14/0282 |
| | | | 398/156 |

(Continued)

FOREIGN PATENT DOCUMENTS

| | | |
|---|---|---|
| CN | 101729949 A | 6/2010 |
| CN | 101895795 A | 11/2010 |

(Continued)

OTHER PUBLICATIONS

International Search Report for Application No. PCT/CN2014/074453 dated Dec. 30, 2014.

*Primary Examiner* — Ken N Vanderpuye
*Assistant Examiner* — Abbas H Alagheband
(74) *Attorney, Agent, or Firm* — Lerner, David, Littenberg, Krumholz & Mentlik, LLP (57) ABSTRACT

Disclosed is a method for monitoring the wavelength of a tunable laser device of user by local OLT. The method is applied to a wavelength division multiplexing passive optical network framework. The framework comprises an ONU, a first athermal array waveguide grating, a transmission optical fiber, a second athermal array waveguide grating and the OLT, which are sequentially connected. ONU comprises tunable wavelength optical transmitters. The method comprises: starting handshaking is carried out between the OLT and the ONU; and the OLT carries out wavelength drifting monitoring during operation of the ONU. Wavelength adjustment can be carried out on the multi-channel tunable laser device in an external auxiliary monitoring environ- (Continued)

ment, thus channel wavelengths of the multi-channel tunable laser device can be accurately controlled, and the requirement for calibration accuracy of channels of the tunable laser device at the ONU is greatly reduced.

13 Claims, 3 Drawing Sheets

(51) Int. Cl.
  *H04B 10/00* (2013.01)
  *H04J 14/02* (2006.01)
  *H04B 10/079* (2013.01)
  *H04J 14/00* (2006.01)
  *H04B 10/073* (2013.01)

(52) U.S. Cl.
  CPC ............ *H04J 14/02* (2013.01); *H04B 10/079* (2013.01); *H04B 10/0731* (2013.01); *H04J 14/0282* (2013.01)

(58) Field of Classification Search
  CPC ...... H04B 10/079; H04B 10/08; H04B 10/57; H04J 14/02; H04J 3/0667; H04J 14/0246; H04J 14/00
  USPC ................................................ 398/34, 67–71
  See application file for complete search history.

(56) References Cited

U.S. PATENT DOCUMENTS

| | | | |
|---|---|---|---|
| 9,173,013 B2* | 10/2015 | Rohde | H04B 10/0731 |
| 9,571,187 B2* | 2/2017 | Lee | H04B 10/0795 |
| 2007/0280695 A1* | 12/2007 | Li | H04B 10/506 398/135 |
| 2008/0304828 A1* | 12/2008 | Mizutani | H04B 1/707 398/78 |
| 2010/0158527 A1* | 6/2010 | Mizutani | H04B 1/707 398/78 |
| 2011/0236017 A1* | 9/2011 | Ohlen | H04J 14/0282 398/34 |
| 2012/0163809 A1* | 6/2012 | Sugawa | H04B 10/272 398/34 |
| 2012/0183297 A1* | 7/2012 | Rohde | H04B 10/0731 398/90 |
| 2012/0263474 A1* | 10/2012 | Huang | H04B 10/25754 398/93 |
| 2013/0004174 A1* | 1/2013 | Lee | H04J 14/0246 398/79 |
| 2013/0045005 A1* | 2/2013 | Nakura | H04B 10/272 398/25 |
| 2013/0094862 A1* | 4/2013 | Luo | H04J 14/0278 398/68 |
| 2014/0233954 A1* | 8/2014 | Lee | H04J 14/0246 398/72 |
| 2015/0023664 A1* | 1/2015 | Mukai | H04J 14/0242 398/58 |

FOREIGN PATENT DOCUMENTS

| | | | |
|---|---|---|---|
| CN | 102577428 A | 7/2012 | |
| WO | WO 2011020515 A1 * | 2/2011 | ......... H04B 10/0731 |

* cited by examiner

METHOD FOR MONITORING WAVELENGTH OF TUNABLE LASER ON USER END BY OPTICAL LINE TERMINAL ON LOCAL END

CROSS REFERENCE TO RELATED APPLICATIONS

The present application is a national phase entry under 35 U.S.C. § 371 of International Application No. PCT/CN2014/074453, filed Mar. 31, 2014, which claims priority from Chinese Patent Application No. 201410123387.X filed Mar. 28, 2014, all of which are hereby incorporated herein by reference.

TECHNICAL FIELD

Embodiments of the present invention relate to a method for monitoring the wavelength of a tunable laser during ONU (Optical Network Unit) is booting and running, and more particularly to a control method for monitoring the wavelength of a tunable laser of ONU on user end in real time in WDM-PON (Wavelength Division Multiplexing-Passive Optical Network), to ensure its operation wavelength is correct, which is belonged to field of communication.

BACKGROUND OF THE INVENTION

WDM-PON access network technologies have been developed for many years, a technical bottleneck of which is about colorless ONU module. Earlier technology on colorless ONU module based on injection-locked multi-channel laser has been proven unsuitable for use in high-rate. In recent years, with the increasing requirements on access bandwidth, WDM-PON access network has been turning to use multi-channel tunable lasers to realize function of colorless ONU.

As known in the art, the multi-channel tunable laser was developed rapidly in recent years. Product of multi-channel tunable laser based on SGDBR (Sampled Grating Distributed Bragg Reflector) was widely applied in 10 Gb/s and 40 Gb/s system. Advanced tunable lasers based on external cavity laser and some special semiconductor even can be applied successfully in 100 Gb/s coherent system. It is technically feasible to use these lasers to achieve colorless ONU function. However, due to complex manufacturing process of the multi-channel tunable laser, and its huge amount of data calibration in multi-channel and wide temperature range, production costs thereof are always high. High cost of ONU devices has been bottleneck for large-scale application of WDM-PON technology.

How to reduce the cost of a colorless ONU as far as possible with meeting application requirements of WDM-PON access network is a key issue in current field. The multi-channel tunable laser is key factor to address the issue, since the multi-channel tunable lasers accounted for most of the hardware cost of the ONU. In recent years, it is also proposed some targeted tunable laser solutions for WDM-PON, such as a solution based on gain dies plus external cavity tunable grating structure, as well as a solution based on gain dies plus external cavity double resonant loop tuning, and even a solution directly using a semiconductor integrated tunable laser die similar with SGBDR, and so on. These production techniques shared similar ideas on dealing with wavelength channel power-on accuracy and wavelength stability control in operation, namely, which are realized by self-monitoring and control of laser, which will increase technical complexity of the multi-channel tunable lasers, including high standards of hardware requirements, and complex and time-consuming workload of calibration and testing.

BRIEF SUMMARY OF THE INVENTION

An object of embodiment of the present invention is to overcome technical drawbacks in the prior art, and propose a method of monitoring wavelength of ONU tunable laser by OLT (Optical Line Terminal) on local end. Embodiments of the present invention are implemented in WDM-PON architecture using ONU tunable optical transmitter. The method of embodiment of the present invention can greatly lower requirements on wavelength self-calibration of the multi-wavelength tunable laser, thus lowering cost of such devices.

According to an embodiment of the present invention, there is provided a method for monitoring wavelength of a tunable laser on user end by OLT on local end, characterized in that the method is applied to WDM-PON architecture, which comprises an ONU, a first athermal array waveguide grating, transmission fiber, a second athermal array waveguide grating, and OLT connected sequentially. The ONU comprises a wavelength tunable optical transmitter. Said method comprises steps as following: step 1, boot handshake being carried out between said OLT and the ONU, comprising step 1-1, the OLT sending query command to ONU continuously if not received optical signal from ONU; step 1-2, ONU starting wavelength channel scan after receiving the query command, until the OLT receives optical signal emitted from the ONU, at time of which the OLT sending acknowledgement of "wavelength of the received optical signal is right" to the ONU; step 1-3, the ONU latching channel corresponding to the wavelength after received the acknowledgement, optical detector of the wavelength tunable optical transmitter recording optical power value corresponding to driving conditions of the channel in real time, to obtain an optical power spectrum, and locking driving conditions corresponding to optimum operating state of the wavelength tunable optical transmitter according to the optical power spectrum; the ONU replying to the OLT with instruction information of "having entered operation state" after completing the locking process; and step 1-4, the OLT confirming entering communication state after receiving the instruction information.

After step of boot handshake is completed, the OLT performs wavelength drift monitoring in operation of the ONU, which comprises steps as following: step 2-1, the OLT receiving optical signal from the ONU regularly, when the OLT detects that optical power of the optical signal decreases below a threshold of optical power, the OLT sending a wavelength scanning instruction to the ONU; step 2-2, the ONU performing wavelength scan in wavelength range of the channel latched in the step 1-3 according to the wavelength scanning instruction, that is, emitting laser with continuously changed wavelengths to the OLT; step 2-3, when wavelength corresponding to maximum optical power of the laser with continuously changed wavelengths received by the OLT is not in middle position of the wavelength range of the latched channel, instructing the ONU to move scanning wavelength range to side where optical power is larger, until the middle position of the scanning wavelength range is moved to position corresponding to the maximum optical power.

The first athermal arrayed waveguide grating, and the second athermal arrayed waveguide grating can be Gaussian athermal arrayed waveguide grating.

In said step 1-2, wavelength channel scanning process includes the following steps: ONU continuously or quasi-continuously changing output wavelength of the wavelength tunable optical transmitter, sequentially traversing all wavelength channels to emit optical signal to OLT, optical detector of the wavelength tunable optical transmitter recording optical power value of the optical signal in real time In the wavelength channel scanning process of the step 1-2, the OLT monitors whether the optical signal from the ONU is received.

The wavelength tunable optical transmitter includes an external cavity laser grid filter, which uses an etalon with center wavelength corresponding to standard ITU-T channel wavelength and spacing same as laser channel spacing.

In the step 1-3, by using an algorithm for tracking extremum of the optical power spectrum to obtain extreme points of the optical power, or by using an algorithm for tracking certain local slope of the optical power spectrum, the driving conditions corresponding to optimum operation state of wavelength tunable optical transmitter can be locked.

Embodiments of the present invention have the following advantages: 1) In WDM-PON architecture using athermal AWG to perform access path selection, implementation of such wavelength monitor does not require any additional network hardware; 2) By the ONU wavelength correction manner with boot handshake and frequency reuse monitoring, requirement for wavelength control accuracy and long-term stability of ONU itself can be lowered, even requirement for calibration and testing of such devices can be lowered, which is very important to realizing low-cost colorless ONU; 3) Embodiments of the present invention provide an auxiliary wavelength monitoring method by system architecture facilities, by cooperating with field self-calibration process of tunable laser of the ONU, power-on wavelength monitoring and wavelength drift monitoring in operation of multi-channel tunable laser of the ONU is realized; this method can simplify requirement on positioning accuracy of power-on wavelength of the multi-channel tunable laser of the ONU, that is, can lower relevant hardware requirement for accurate positioning of power-on wavelength, while can greatly simplify large amount of calibration, compensation and correction work of multi-channel driving data, significantly reducing the cost of ONU.

In the Figures:
1: ONU;
1-1: ONU optical receiver;
1-2: C/L-WDM;
1-3: wavelength tunable optical transmitter;
1-4: ONU controller;
2: OLT;
2-1: OLT optical receiver;
2-2: C/L-WDM;
2-3: OLT optical transmitter;
2-4: OLT controller;
3: first athermal arrayed waveguide grating;
4: second athermal arrayed waveguide grating;
5: transmission fiber

EMBODIMENTS

The accompanying drawings and the following examples are used for further illustrating the concept of the present invention.

Figure 1:
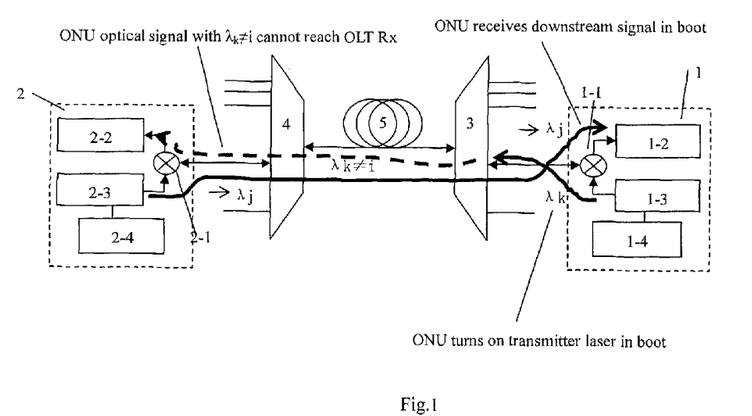
FIG. 1 is a transmission diagram in case that wavelength of upstream optical signal in WDM-PON network architecture is incorrect, according to an embodiment of the present invention.

FIG. 1 shows the WDM-PON network architecture which the method of embodiments of the present invention is based on. The WDM-PON network architecture comprises ONU 1 at user end, OLT 2 at local end, a first athermal arrayed waveguide grating 3, a second athermal arrayed waveguide grating 4, transmission fiber 5, wherein ONU 1 is connected with the first athermal arrayed waveguide grating 3, which is connected with the second athermal arrayed waveguide grating 4 via the transmission fiber 5, the second athermal arrayed waveguide grating 4 is connected with the OLT 2 at local end. ONU 1 comprises an optical receiver 1-1, C/L-WDM 1-2, wavelength tunable optical transmitter 1-3, ONU controller 1-4. OLT 2 comprises an OLT optical receiver 2-1, C/L-WDM 2-2, OLT optical transmitter 2-3, OLT controller 2-4. The first athermal arrayed waveguide grating 3 and the second athermal arrayed waveguide grating 4 use Gaussian athermal arrayed waveguide grating.

Figure 2:
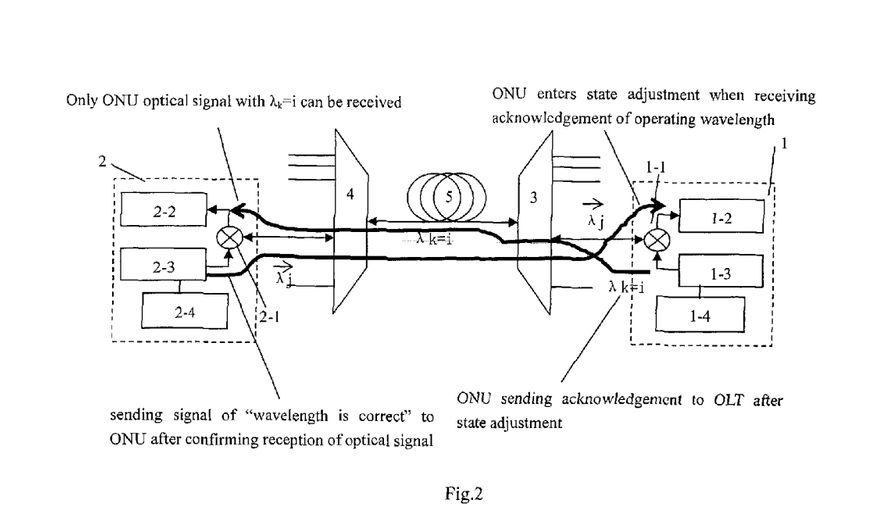
FIG. 2 is a transmission diagram in case that wavelength of upstream optical signal in WDM-PON network architecture is correct, according to an embodiment of the present invention.

FIGS. 1 and 2 are diagrams showing transmission of upstream/downstream optical signal in WDM-PON network architecture based on user end using a wavelength tunable laser. Because channel transmission wavelength of the OLT is always fixed (downstream signal at system side should be normally on), downstream optical signal of the OLT can always arrive corresponding user. However, upstream optical signal of the ONU is not the case, in which ONU is only powered on when in use, thus there will be a problem whether power-on wavelength is correct or not each time when powered on. Of course, when newly replacing or installing ONU, there will be same problem. Where wavelength of upstream optical signal when powered on cannot meet requirement due to any reason, since the athermal AWG channel selection function in the architecture may cause the OLT cannot receive the optical signal, only wavelength of the upstream optical signal is correct, can the OLT receive it.

Embodiments of this patent utilize selective function on a particular channel operating wavelength by this fixed architecture, by wavelength monitoring function of the OLT end and excellent condition of downstream signal of the OLT, and by monitoring and guiding of operating wavelength during powered on of ONU until ONU is of correct powered on wavelength and enters into operation state. Entire monitoring and guidance process of wavelength may be implemented by a boot handshake process. As known in the art, according to the signal transmission characteristics of optical access network, OLT should always be in the correct state of power on, only ONU can be in a state of intermittent on-line or off-line. On-line process of the ONU must go through a procedure from OLT polling to confirming that the OLT has entered into operating state. An important aspect of embodiments of the present invention is to add a supplementary correction function of wavelength information of ONU in the procedure from OLT polling to confirming that the OLT has entered into operating state.

Figure 3:
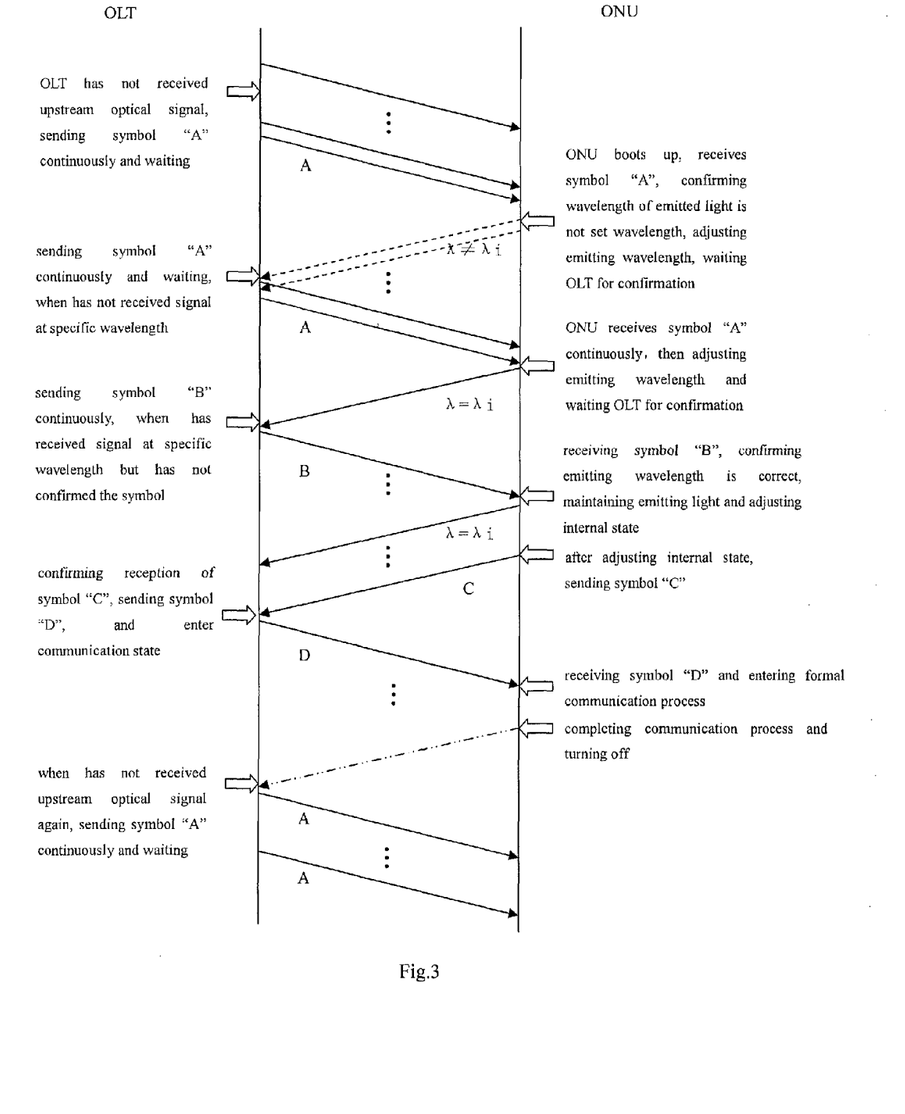
FIG. 3 is a schematic diagram showing a process of OLT guiding ONU to operate under correct wavelength when powered on by handshake program, according to an embodiment of the present invention.

FIG. 3 is a schematic diagram showing process of guiding ONU to operate in correct wavelength when powered on by handshake program, and describes the entire process from powered on to wavelength calibration of ONU then to entering normal communication until powered off. Before powered on of the ONU, OLT keeps sending down a special symbol "A" which is equivalent to polling signal on online state. According to a protocol, powered on ONU receiver can receive and identify the symbol. After user ONU is powered on and receive polling command, it starts the wavelength channel scanning, that is, when powered on, those two operations are performed by ONU immediately as following: firstly, turning on the wavelength tunable transmitter 1-3, which is tunable laser according to setting requirements; secondly, analyzing downstream information received by the transmitter, such as the symbol "A" in the beginning, which is not only polling signal for online state, but also indication signal for incorrect wavelength. ONU confirms that operation wavelength of the transmitter is incorrect at this time by recognizing symbol "A", then adjusts wavelength of the wavelength tunable transmitter that is tunable laser. When wavelength of ONU transmitter is correct and then the OLT evaluates that power of the optical signal of received optical signal emitted from ONU 1 meets requirements of WDM-PON network system, the OLT can confirm that wavelength of emitted light is correct after receiving stable optical signal without symbol, and then can send symbol "B" to the ONU, which can confirm that it is operating in correct wavelength by recognizing symbol "B". However, under normal condition, in order to enhance environmental adaptability, or based on stability control factor, the ONU may require some adjustment work of the state at this time. Before finishing state adjustment, the ONU does not send state acknowledgment signal to the OLT, and sends only CW optical signal. Therefore, in case of receiving upstream optical signal and not recognizing upstream symbol, the OLT still continues to send symbol "B" to the ONU, then the ONU can perform state adjustment while receiving the symbol "B" continuously, to ensure that the adjustment is always performed at correct wavelength. After the completion of status adjustment, the ONU will send symbol "C" to the OLT, and gets ready for communication. The OLT confirms that the ONU has entered the state after receiving and recognizing the symbol "C", then sends symbol "D" to the ONU, which enters communication process after receiving and recognizing the symbol "D" until all the contents of the communication are completed, then the ONU is powered off to be offline. OLT send down the symbol "A" again continuously due to inability to receive an upstream signal, and waits the ONU being online. With this handshake process, it can ensure that powered on wavelength of ONU transmitter is correct by the auxiliary monitoring of the OLT.

The specific process of user ONU performing the wavelength channel scan is as following: the ONU changes channel driving conditions of the multi-channel tunable laser in ONU wavelength tunable optical transmitter continuously or quasi-continuously, then makes output wavelength of the multi-channel tunable laser traverses all wavelengths channels sequentially, optical detector in ONU wavelength tunable optical transmitter can record optical power value of the laser in real time; at the same time, OLT end is always monitoring whether there is upstream optical power of corresponding ONU, and once received upstream optical power meeting WDM-PON network system requirements, the OLT sends wavelength confirmation signal to corresponding ONU, which locks the current drive channel after receiving the wavelength confirmation signal, while replying OLT that it has entered into working state, thus the wavelength channel scanning process is completed.

It should be noted that, after the ONU is powered on as above-mentioned, the ONU will generally turn on specified wavelength channel according to preset program. Auxiliary correction of wavelength information correction in handshake only works when the power-on wavelength of the ONU is incorrect, which is therefore wavelength correction security function. This is very important, for those ONU of which calibration data is susceptible to temperature and other environmental factors.

As above-mentioned, state adjustment of the ONU after confirming emitting wavelength is correct with support of OLT auxiliary information is based on consideration for stability to adjust wavelength set properly. Obviously, multi-channel tunable optical transmitter of the ONU itself has wavelength scan function. By adding state assessment mechanism to wavelength tunable optical transmitter of the ONU, in case of confirming correct wavelength by receiving the symbol "B" and performing state adjustment by finely tuning wavelength, it can be determined whether stable working state is reached according to the state assessment mechanism. This so-called status assessment was realized by monitoring optical power with ITU-T interval cycle properties. It is clear that the optical power reaches a maximum in the vicinity of accurate wavelength of each ITU-T, as can be seen in power spectral characteristics shown in FIG. 4. This method can be easily used to determine whether wavelength enters a desired region with wavelength deviation allowed by a margin of error.

The wavelength tunable optical transmitter in ONU of embodiments of the present invention is added with a state assessment mechanism specifically in that: during boot handshake with the wavelength channel scanning process, photodetector in wavelength tunable optical transmitter in ONU can record in real time optical power value corresponding to driving condition of laser, to obtain optical power spectrum. By using an algorithm for tracking extremum of the optical power spectrum to obtain extreme points of the optical power, or by using an algorithm for tracking certain local slope of the optical power spectrum to obtain minimum absolute value of the slope, the driving conditions of the laser corresponding to optimum operation state of the laser can be locked. ONU 1 on user end replies to the OLT 2 with indicative information of "has entered the work state" after completion of the adjustment process. During optimum operation state locking process of the laser, the ONU must monitor wavelength confirmation information sent from the OLT in entire process, to ensure that wavelength of the laser is always in the operating range of channels during later recording process of the optical power, while the ONU need detects optical power by its detector, and start to analyze collected optical power spectrum, in order to confirm its spectral features is suitable to implement corresponding algorithm and control, in which the algorithm can be an algorithm for tracking extremum of the optical power spectrum to obtain extreme points of the optical power, or an algorithm for tracking certain local slope of the optical power spectrum. For spectrum not suitable to implement the corresponding algorithms and control, the ONU will optimize it to a form suitable to implement corresponding algorithm and control by amending other driving conditions of multi-channel tunable laser properly.

Figure 4:
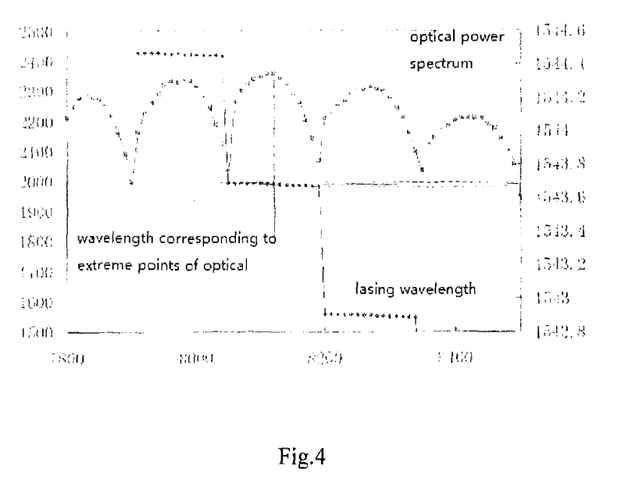
FIG. 4 is a diagram showing principle of positioning center of wavelength by optical power maximum value determination method, according to an embodiment of the present invention.
Figure 5:
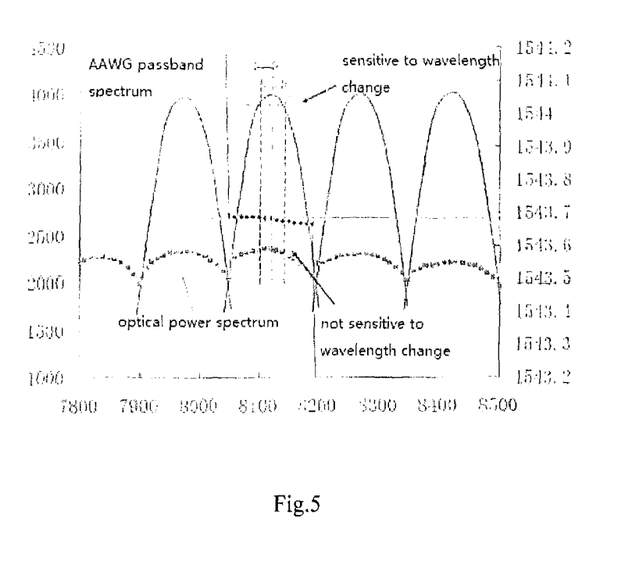
FIG. 5 is a diagram showing principle of ONU wavelength monitoring through OLT in case of ONU scrambling scanning, according to an embodiment of the present invention.

In order to ensure accurate output of the tunable laser standard ITU-T channel wavelength, embodiments of the present invention employ a tunable filter capable of full-band scanning to achieve channel tuning. With embodiments of the present invention, wavelength tunable optical transmitter in the ONU uses an etalon with center wavelength corresponding to standard ITU-T channel wavelength and spacing same as laser channel spacing as filter device of the external cavity laser. Locking condition of driving channel of multi-channel tunable laser drive is embodied based on a mechanism for monitoring output optical power of the laser. For the external cavity laser using etalon as periodic optical filter, when continuously adjusting cavity length of the laser, output optical power of the laser varies periodically, period of which is consistent with filtering band of the etalon. Period of the etalon is same as channel interval of multi-channel laser. With characteristic that optical power changes with filtering characteristic of the etalon, monitoring algorithm can be used, that is, by using an algorithm for tracking extremum of the optical power spectrum to obtain extreme points of the optical power, or by using an algorithm for tracking certain local slope of the optical power spectrum to obtain minimum absolute value of the slope, the driving channel of the multi-channel tunable laser can be locked Wavelength of ONU transmitter may drift during operation due to various reasons. Wavelength tunable optical transmitter typically take special wavelength-locking technology for drift compensation, such as adding a wavelength drift detection means for real-time monitoring, an optical power self-detection method mentioned above, automatically correcting the drift during the process by the extremum search method, and so on. However, the method by adding a wavelength drift detection means will obviously increase the production and calibration complexity of the transmitter, which is not desirable for cost-sensitive devices. The optical power self-detection method as above mentioned is basically feasible, but in some special cases there may be problems, e.g., when a power spectrum in FIG. 4 is too flat, it will result undetectable fluctuation of optical wavelength in a large range. If monitoring of the wavelength drift during the process can be realized by a method similar to power-on monitoring method of the OLT, it can greatly improve the stability of the entire system. Therefore, embodiments of the present invention utilizes selective function of particular channel wavelength by fixed architecture, in particular utilizes passband characteristics of athermal AWG in which passband spectrum of Gaussian optical filter light has good sensitivity to wavelength. Thus output power of the laser which would have been insensitive to the wavelength will be more sensitive to the wavelength after passing the passband of the Gaussian athermal AWG. Through an interactive process between the OLT and the ONU as complement and supplement to usual ONU wavelength locking process, wavelength of ONU emitting light is monitored and dynamically corrected in real time, in the communication process. The specific approach is: after completing boot handshake procedure, OLT side generally no longer sends to the ONU side instruction information on wavelength of wavelength tunable optical transmitter, but will regularly receive and analyze optical signal of the ONU. If optical signal of the ONU is subjected to excessive wavelength deviation, when passing corresponding transmission channel of the athermal AWG, optical loss will increase. Thus when the OLT detects the optical power drops by more than threshold set by system, it is assumed on OLT side that wavelength deviation is appeared in ONU, while OLT will send wavelength scanning instruction to ONU side, of which wavelength scanning range is within the channel locked during process of boot handshake. The wavelength scanning range can be adjusted according to test results. Corresponding ONU performs wavelength scanning according to the command, of which principle is shown in FIG. 5. The OLT determines whether significant drift is appearing in current center wavelength of the ONU, depending on whether maximum optical power appears in the middle of scanned wavelength. If it is found by scanning that the maximum optical power does not appear in the middle of the initial scanning wavelength, the ONU is commanded to move the scanning wavelength to the side in which optical power is larger until the maximum optical power in the middle of the initial scanning wavelength, then a correction process is completed, and OLT goes back to process of regularly receiving and analyzing optical signal of the ONU. It should be noted that, as the process is completed synchronously with the normal communication process between OLT and ONU, the scanning process previously described occurred in an implementation-defined range, and all the information transmission for wavelength drift and wavelength adjustment is realized by multiplexing signal with a very low frequency with the normal communication signal.

Mentioned above are only a few embodiment examples of the invention. Though there is specific and detailed description in context, they should not thereby be understood as limitations to the application scope of this invention. What should be noted is that, possible variations and modifications developed by ordinary technicians in this field, without departing from the inventive concept of this invention, are all covered in the protection scope of this invention. Thus the protection scope of this invention should be subject to the appended Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for monitoring wavelength of a tunable laser on user end by OLT on local end, wherein the method is applied to WDM-PON architecture, which WDM-PON architecture comprises an ONU (1), a first athermal array waveguide grating (3), transmission fiber (5), a second athermal array waveguide grating (4), and an OLT (2) connected sequentially, the ONU (1) comprises a wavelength tunable optical transmitter (1-3), said method comprises steps as following:

step 1, boot handshake carried out between the OLT (2) and the ONU (1), comprising the steps of:

step 1-1, the OLT (2) sending query command to ONU (1) continuously if it has not received an optical signal from ONU (1);

step 1-2, ONU (1) starting wavelength channel scan after receiving the query command, until the OLT (2) receives an optical signal emitted from the ONU (1), at time of which the OLT (2) sending acknowledgement of "wavelength of a received optical signal is correct" to the ONU (1);

step 1-3, the ONU (1) latching channel corresponding to the wavelength after it has received the acknowledgement, an optical detector of the wavelength tunable optical transmitter (1-3) recording optical power value corresponding to driving conditions of the channel in real time, to obtain an optical power spectrum, and locking driving conditions corresponding to optimum operating state of the wavelength tunable optical transmitter (1-3) according to the optical power spectrum; the ONU (1) replying to the OLT (2) with instruction information of "having entered operation state" after completing the locking driving conditions; and step 1-4, the OLT (2) confirming entering communication state after it has received the instruction information;

wherein after the step of boot handshake is completed, the OLT (2) performs wavelength drift monitoring in operation of the ONU (1), which comprises the steps as following:

step 2-1, the OLT (2) receiving optical signal from the ONU (1) regularly, when the OLT (2) detects that optical power of the optical signal decreases below a threshold of optical power, the OLT (2) sending a wavelength scanning instruction to the ONU (1);

step 2-2 the ONU (1) performing wavelength scan in wavelength range of the channel latched in the step 1-3 according to the wavelength scanning instruction by emitting laser with continuously changed wavelengths to the OLT (2); and step 2-3, when wavelength corresponding to maximum optical power of the laser with continuously changed wavelengths received by the OLT (2) is not in middle position of the wavelength range of the latched channel, instructing the ONU (1) to move scanning wavelength range to side where optical power is larger, until the middle position of the scanning wavelength range is moved to position corresponding to the maximum optical power.

2. The method for monitoring wavelength of a tunable laser on user end by OLT on local end of claim 1, wherein the first athermal arrayed waveguide grating (3), and the second athermal arrayed waveguide grating (4) are Gaussian athermal arrayed waveguide gratings.

3. The method for monitoring wavelength of a tunable laser on user end by OLT on local end of claim 1, wherein in the step 1-2, the wavelength channel scan includes the following steps: ONU (1) continuously or quasi-continuously changing output wavelength of the wavelength tunable optical transmitter (1-3), sequentially traversing all wavelength channels to emit optical signal to OLT (2), optical detector of the wavelength tunable optical transmitter (1-3) recording optical power value of the optical signal in real time.

4. The method for monitoring wavelength of a tunable laser on user end by OLT on local end of claim 3, wherein in the wavelength channel scan of step 1-2, the OLT (2) monitors whether the optical signal from the ONU (1) is received.

5. The method for monitoring wavelength of a tunable laser on user end by OLT on local end of claim 1, wherein the wavelength tunable optical transmitter (1-3) includes an external cavity laser grid filter, which uses an etalon with center wavelength corresponding to standard ITU-T channel wavelength and spacing same as laser channel spacing.

6. The method for monitoring wavelength of a tunable laser on user end by OLT on local end of claim 1, wherein in step 1-3, using an algorithm for tracking extremum of the optical power spectrum to obtain extreme points of the optical power, or using an algorithm for tracking local slope of the optical power spectrum, the driving conditions corresponding to optimum operation state of wavelength tunable optical transmitter is locked.

7. The method for monitoring wavelength of a tunable laser on user end by OLT on local end of claim 1, wherein the first athermal arrayed waveguide grating (3), and the second athermal arrayed waveguide grating (4) are Gaussian athermal arrayed waveguide gratings.

8. The method for monitoring wavelength of a tunable laser on user end by OLT on local end of claim 1, wherein in said step 1-2, the wavelength channel scan includes the following steps: ONU (1) continuously or quasi-continuously changing output wavelength of the wavelength tunable optical transmitter (1-3), sequentially traversing all wavelength channels to emit optical signal to OLT (2), optical detector of the wavelength tunable optical transmitter (1-3) recording optical power value of the optical signal in real time.

9. The method for monitoring wavelength of a tunable laser on user end by OLT on local end of claim 8, wherein in the wavelength channel scan of step 1-2, the OLT (2) monitors whether the optical signal from the ONU (1) is received.

10. The method for monitoring wavelength of a tunable laser on user end by OLT on local end of claim 1, wherein the wavelength tunable optical transmitter (1-3) includes an external cavity laser grid filter, which uses an etalon with center wavelength corresponding to standard ITU-T channel wavelength and spacing same as laser channel spacing.

11. The method for monitoring wavelength of a tunable laser on user end by OLT on local end of claim 1, wherein in step 1-3, by using an algorithm for tracking extremum of the optical power spectrum to obtain extreme points of the optical power, or by using an algorithm for tracking local slope of the optical power spectrum, the driving conditions corresponding to optimum operation state of wavelength tunable optical transmitter is locked.

12. A method for monitoring wavelength of a tunable laser on user end by OLT on local end, wherein the method is applied to WDM-PON architecture, which WDM-PON architecture comprises an ONU (1), a first athermal array waveguide grating (3), transmission fiber (5), a second athermal array waveguide grating (4), and an OLT (2) connected sequentially, the ONU (1) comprises a wavelength tunable optical transmitter (1-3), said method comprises steps as following:

step 1, boot handshake carried out between the OLT (2) and the ONU (1), comprising the steps of:

step 1-1, the OLT (2) sending query command to ONU (1) continuously if it has not received an optical signal from ONU (1);

step 1-2, ONU (1) starting wavelength channel scan after receiving the query command, until the OLT (2) receives an optical signal emitted from the ONU (1), at time of which the OLT (2) sending acknowledgement of wavelength of the a received optical signal is correct to the ONU (1);

step 1-3, the ONU (1) latching channel corresponding to the wavelength after it has received the acknowledgement, an optical detector of the wavelength tunable optical transmitter (1-3) recording optical power value corresponding to driving conditions of the channel in real time, to obtain an optical power spectrum, and locking driving conditions corresponding to optimum operating state of the wavelength tunable optical transmitter (1-3) according to the optical power spectrum; the ONU (1) replying to the OLT (2) with instruction information of having entered operation state after completing the locking driving conditions; and step 1-4, the OLT (2) confirming entering communication state after it has received the instruction information;

wherein the wavelength channel scan includes the following steps: ONU (1) continuously or quasi-continuously changing output wavelength of the wavelength tunable optical transmitter (1-3), sequentially traversing all wavelength channels to emit optical signal to OLT (2), optical detector of the wavelength tunable optical transmitter (1-3) recording optical power value of the optical signal in real time.

13. A method for monitoring wavelength of a tunable laser on user end by OLT on local end, wherein the method is applied to WDM-PON architecture, which WDM-PON architecture comprises an ONU (1), a first athermal array waveguide grating (3), transmission fiber (5), a second athermal array waveguide grating (4), and an OLT (2) connected sequentially, the ONU (1) comprises a wavelength tunable optical transmitter (1-3), said method comprises steps as following:

step 1, boot handshake carried out between the OLT (2) and the ONU (1), comprising the steps of:

step 1-1, the OLT (2) sending query command to ONU (1) continuously if it has not received an optical signal from ONU (1);

step 1-2, ONU (1) starting wavelength channel scan after receiving the query command, until the OLT (2) receives an optical signal emitted from the ONU (1), at time of which the OLT (2) sending acknowledgement of wavelength of the a received optical signal is correct to the ONU (1);

step 1-3, the ONU (1) latching channel corresponding to the wavelength after it has received the acknowledgement, an optical detector of the wavelength tunable optical transmitter (1-3) recording optical power value corresponding to driving conditions of the channel in real time, to obtain an optical power spectrum, and locking driving conditions corresponding to optimum operating state of the wavelength tunable optical transmitter (1-3) according to the optical power spectrum; the ONU (1) replying to the OLT (2) with instruction information of having entered operation state after completing the locking driving conditions; and step 1-4, the OLT (2) confirming entering communication state after it has received the instruction information;

wherein in step 1-3, using an algorithm for tracking extremum of the optical power spectrum to obtain extreme points of the optical power, or using an algorithm for tracking local slope of the optical power spectrum, the driving conditions corresponding to optimum operation state of wavelength tunable optical transmitter is locked.

* * * * *